United States Patent
Reichard et al.

(10) Patent No.: US 12,076,880 B2
(45) Date of Patent: Sep. 3, 2024

(54) SLICING DEVICE

(71) Applicant: Weber Maschinenbau GmbH Breidenbach, Breidenbach (DE)

(72) Inventors: Axel Reichard, Siegen (DE); Thorsten Arnold, Dautphetal (DE); Theo Horst, Amöneburg/Rossdorf (DE); Andreas Runkel, Biedenkopf (DE)

(73) Assignee: Weber Food Technology GmbH, Breidenbach (DE)

( * ) Notice: Subject to any disclaimer, the term of this patent is extended or adjusted under 35 U.S.C. 154(b) by 301 days.

(21) Appl. No.: 17/513,807

(22) Filed: Oct. 28, 2021

(65) Prior Publication Data
US 2022/0134590 A1 May 5, 2022

(30) Foreign Application Priority Data
Oct. 29, 2020 (DE) .......................... 102020128533.7

(51) Int. Cl.
*B26D 7/34* (2006.01)
*A23L 3/3589* (2006.01)
*B26D 5/00* (2006.01)

(52) U.S. Cl.
CPC .............. *B26D 7/34* (2013.01); *A23L 3/3589* (2013.01); *B26D 5/00* (2013.01); *A23V 2002/00* (2013.01); *B26D 2210/02* (2013.01)

(58) Field of Classification Search
CPC ........ B26D 7/34; B26D 5/00; B26D 2210/02; B26D 7/325; A23L 3/3589; A23V 2002/00

(Continued)

(56) References Cited

U.S. PATENT DOCUMENTS 3,420,209 A * 1/1969 Hensgen .................. B26D 7/34
                                                        118/15
4,852,441 A * 8/1989 Anders .................... B26D 7/34
                                                        99/534

(Continued)

FOREIGN PATENT DOCUMENTS

| DE | 102007048015 A1 | 4/2009 |
| DE | 102013207401 A1 | 10/2014 |
| WO | 2012151397 A1 | 11/2012 |

OTHER PUBLICATIONS

European Search Report dated Mar. 17, 2022 for European Application No. 21203967.1, 8 pages.

(Continued)

*Primary Examiner* — Omar Flores Sanchez
(74) *Attorney, Agent, or Firm* — Dickinson Wright PLLC

(57) ABSTRACT

The invention relates to a slicing apparatus for slicing food products, in particular to a high-performance slicer, comprising a product feed that feeds products to be sliced on one or more tracks in a feed direction to a cutting region in which the products are cut into slices during a cutting operation of the slicing apparatus by means of a cutting blade, in particular a revolving and/or rotating cutting blade, that performs cutting movements; a portioning region in which portions are formed from the slices and each comprise one slice or a plurality of slices disposed at least partly above one another; and a control device that controls the cutting operation and that has operating information that relates to the cutting operation, wherein a treatment agent device for providing a liquid treatment agent is integrated into the slicing apparatus and is configured to provide the treatment agent during the cutting operation such that the treatment agent is applied to a respective cut surface of a product and/or to at least one respective flat side of at least one slice, and wherein a control unit is provided for the treatment (Continued)

Figure 1:
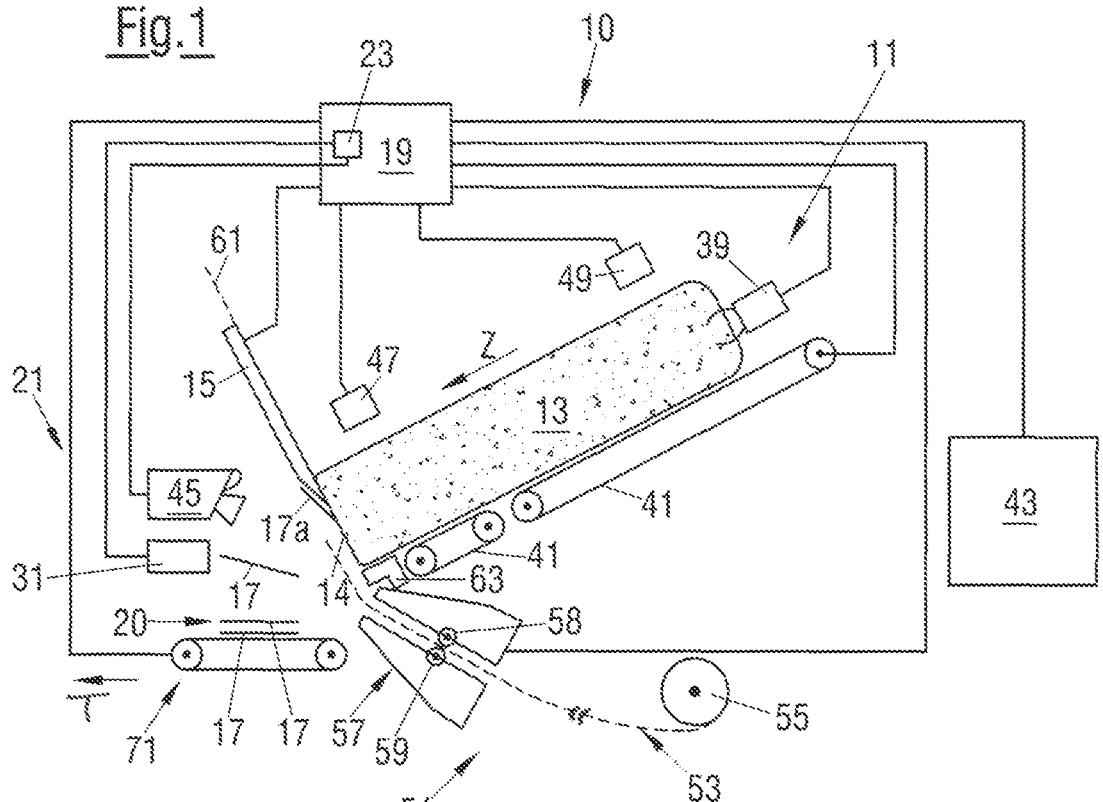

agent device and is configured to control the operation of the treatment agent device in dependence on the cutting operation on the basis of at least a portion of the operating information of the control device.

21 Claims, 1 Drawing Sheet

(58) Field of Classification Search
USPC .............................................................. 83/13
See application file for complete search history.

(56) References Cited

U.S. PATENT DOCUMENTS

| | | | | |
|---|---|---|---|---|
| 5,724,874 | A * | 3/1998 | Lindee | B26D 7/22 |
| | | | | 83/403.1 |
| 2005/0266131 | A1* | 12/2005 | King | A23L 13/76 |
| | | | | 426/534 |
| 2009/0188363 | A1* | 7/2009 | Lindee | A22C 17/0093 |
| | | | | 83/435.16 |
| 2011/0265431 | A1* | 11/2011 | Ramabadran | B26D 7/34 |
| | | | | 53/513 |
| 2012/0042757 | A1* | 2/2012 | Weber | B26D 7/325 |
| | | | | 83/78 |
| 2017/0368707 | A1* | 12/2017 | Keller | B25J 15/0273 |
| 2019/0152085 | A1* | 5/2019 | Reisz | B26D 7/325 |
| 2019/0329438 | A1* | 10/2019 | Bader | B26D 7/325 |
| 2020/0230838 | A1* | 7/2020 | Einloft-Velte | B26D 1/565 |
| 2020/0282584 | A1* | 9/2020 | Einloft-Velte | B26D 1/565 |
| 2020/0290840 | A1* | 9/2020 | Gerhardt | B65H 35/0086 |
| 2022/0184840 | A1* | 6/2022 | Dahlman, Jr. | A23L 3/3589 |
| 2022/0234236 | A1* | 7/2022 | Stachel | B26D 7/0633 |
| 2023/0321861 | A1* | 10/2023 | Marx | B26D 5/007 |
| | | | | 83/13 |

OTHER PUBLICATIONS

Search Report from the German Patent and Trademark Office for related German Application No. 102020128533.7; dated Sep. 7, 2021; 7 pages.

* cited by examiner

SLICING DEVICE

CROSS-REFERENCES TO RELATED APPLICATIONS

This Patent Application claims the priority of German Patent Application 102020128533.7, filed on Oct. 29, 2020, which is incorporated herein by reference, in its entirety.

The invention relates to a slicing apparatus for slicing food products, in particular to a high-performance slicer, comprising a product feed that feeds products to be sliced on one or more tracks in a feed direction to a cutting region in which the products are cut into slices during a cutting operation of the slicing apparatus by means of a cutting blade, in particular a revolving and/or rotating cutting blade, that performs cutting movements; a portioning region in which portions are formed from the slices and each comprise one slice or a plurality of slices disposed at least partly above one another; and a control device that controls the cutting operation and that has operating information that relates to the cutting operation.

The invention also relates to a method of operating a slicing apparatus, in particular a slicing apparatus as disclosed herein.

Such slicing apparatus, which are also designated as slicers, are generally known. In particular stick-like, bar-like, or loaf-like food products such as sausage, cheese, or ham can be cut into slices by slicers, wherein high-performance slicers achieve cutting speeds of between a plurality of 100 up to some thousand slices per minute.

A cutting blade serves to cut off the slices from the products and in practice is usually a scythe-like blade that only rotates about its own blade axis or a circular blade that rotates about its own blade axis and that additionally revolves in a planetary motion about a further axis of rotation that extends offset in parallel from the blade axis. Due to these cutting movements of the respective cutting blade, a cutting plane is defined by the blade edge of the cutting blade. In practice, the feed of the products usually takes place in a feed direction that extends perpendicular to this cutting plane, wherein, in some applications, the products can also be fed to the cutting plane at an angle different from 90°.

As with many known slicers, provision can also be made in a slicer in accordance with the invention that the products are inclined relative to the horizontal during the cutting operation. The products are in particular disposed on a product support that can, for example, be provided by one or more transport belts or also by a passive sliding surface that merely forms a support. Due to the inclination of the products during the cutting operation, the cut-off slices reach the portioning region better under the effect of gravity, said portioning region in practice usually being formed by a so-called portioning belt that is a comparatively short endless conveyor belt by which the portions formed in the portioning region from one or more slices can be quickly transported away and can be fed to a further processing.

This further processing is in particular a packaging of the portions. A typical food processing line comprises a slicer of the type disclosed herein at the start and an automatic packaging machine at the end. Further devices, for example for the weighing, sorting, buffering, etc. of the portions, can be provided between the slicer and the packaging machine. This is generally known to the skilled person so that it does not need to be looked at in more detail here.

Depending on the respective application, a portion can also be formed by only one single cut-off slice. It is also possible to cut off comparatively thick parts from a food product. This is in particular the case when fresh meat is sliced. The cut-off parts are then also designated as pieces. Such pieces can likewise be portioned, i.e. a portion in the sense of the present disclosure can comprise one or more pieces disposed at least partly above one another. To simplify the terminology used here, such a piece is a slice in the sense of the present disclosure.

If a portion is formed by a plurality of slices, they can be disposed more or less exactly above one another. In this connection, one also speaks of a stack of slices. However, it is also possible that the slices of a portion partly overlap, i.e. are not disposed more or less exactly above one another as in a product stack. Such an arrangement of slices is also designated as an overlapping arrangement. In practice, a wide variety of portioning possibilities with very different portion designs are known that can in particular also be produced in that a device forming a product support in the portioning region is moved, for example rotated, during the cutting off of the slices belonging to a portion in order, for example, to form a circular portion from a plurality of mutually overlapping slices in this manner.

Known slicers often work on multiple tracks, i.e. a plurality of products disposed next to one another and aligned in parallel with one another are simultaneously fed to the cutting region. The product feed can take place individually per track, i.e. the products can be fed independently of one another in the individual tracks. The apparatus used for this purpose and the advantages associated therewith, which also—but not only—lie in a higher product throughput, are generally known to the skilled person. Even though multi-track slicers comprising a plurality of cutting blades that are used at the same time are also known, most known slicers that can be operated on multiple tracks have a single cutting blade, which is usually a correspondingly large scythe-like blade or circular blade, to simultaneously cut off a respective slice from the products disposed next to one another. In this respect, "simultaneously" is to be understood in the sense that the cutting blade is active in all the tracks during a blade revolution—namely during one work cycle of the slicer—but in so doing naturally passes through the tracks after one another in time.

In particular for the end consumer, there is the problem with food slices disposed directly above one in a portion that it can be difficult to separate the slices from one another. This problem in particular occurs with comparatively thinly sliced products, such as raw ham, or with relatively sticky products, such as some types of cheese.

This problem has for a long time been solved by, among other things, so-called interleavers that are additional devices which are integrated into the slicing apparatus and by which interleaved sheets composed of paper or of a film are automatically brought between consecutive cut-off slices. These interleaved sheets then facilitate the removal of individual food slices from a pack including a respective portion.

However, such interleavers are devices that are of a comparatively complex design and that can consequently make a slicer correspondingly more expensive. In addition, the interleavers result in more packaging waste, which means increasing acceptance problems on the part of the end consumer.

As an alternative to interleavers, it is likewise already known to apply liquid separating agents—in particular on the basis of oils suitable for consumption—to the flat sides of the slices, for example by spraying, such that slices disposed above one another can be separated more easily from one another. Known disadvantages of these systems are the lack of adjustability and the not present adaptability to the operation of the respective slicer. Systems for treating the food slices with liquid protective agents, which are, for example, used to extend the shelf life of the food, have the same disadvantages.

It is therefore the object of the invention to provide a slicing apparatus of the initially mentioned kind and a method of operating a slicing apparatus that enable a simple, reliable, and targeted treatment of the food products with a liquid with as little effort as possible.

This object is in each case satisfied by the features of the independent claims.

In a slicing apparatus in accordance with the invention, provision is in particular made that a treatment agent device for providing a liquid treatment agent is integrated into the slicing apparatus and is configured to provide the treatment agent during the cutting operation such that the treatment agent is applied to a respective cut surface of a product and/or to at least one respective flat side of at least one slice, and wherein a control unit is provided for the treatment agent device and is configured to control the operation of the treatment agent device in dependence on the cutting operation on the basis of at least a portion of the operating information of the control device.

Provision is in particular made in the method in accordance with the invention that a treatment agent device is integrated into the slicing apparatus, by which treatment agent device a liquid treatment agent is applied to a respective cut surface of a product and/or to at least one respective flat side of at least one slice during the cutting operation, wherein the operation of the treatment agent device is controlled on the basis of at least a portion of the operating information of the control device.

The invention is based on the idea of not designing the treatment agent device as an independent unit that works without taking into account operating information of the control device of the slicing apparatus and in this respect works either completely independently of the cutting operation or only on the basis of its own sensor system, but of making the operation of the treatment agent device dependent on at least a portion of the operating information of the control device of the slicing apparatus.

In this way, the provision of the treatment agent can be specifically adapted to the requirements of the respective cutting operation. For example, the timing, amount, and/or direction of the dispensing of the treatment agent can take place in coordination with the cutting operation and can, for example, also be changed during the cutting operation.

Merely as an example for the advantages of the invention, mention must be made of the possibility, provided for the first time by the invention, of preventing a dispensing of treatment agent when the slicing apparatus carries out so-called blank cuts. Most high-speed slicers carry out blank cuts when a previously completed portion is transported away to temporarily not produce any cut-off slices. The cutting blade continues to perform cutting movements, but the product feed is temporarily stopped so that no slices are cut off. A conventional stand-alone treatment agent device would not be able to sufficiently quickly recognize a blank cut operation that is starting or taking place. If, in contrast, operating information is made available to the control unit of the treatment agent device by the control device of the slicing apparatus, which is also simply designated as a slicer control in the following, with the slicer control performing a blank cut operation, that is accordingly controlling the product feed, by means of the operating information, then this operating information can be used by the control unit of the treatment agent device to ensure that no provision of treatment agent takes place during the blank cut operation. The treatment agent consumption is hereby reduced and an unnecessary contamination of the slicing apparatus by the treatment agent is prevented.

It can already be seen from this one example that due to the use of the information available in the slicer control on the cutting operation of the slicing apparatus, a variety of possibilities exist for optimally adapting the provision of the treatment agent to the cutting operation.

Another illustrative example is the use of information on the current slice size, that is the size of a slice that is currently being cut off or will be cut off next from the product. The control devices of known slicing apparatus already have such information when the respective slicing apparatus is e.g. equipped with a corresponding sensor system. Such a sensor can, for example, be a scanner that is arranged upstream of the slicing apparatus or that is integrated into the slicing apparatus and that measures the outer product contour. Both the orientation and the size of the respective product cross-section at the cutting plane are then known to the slicer control. This information is already e.g. used to determine the weight of a product slice. In the field that is relevant here, this measurement principle is also known under the keyword "optical scale". Other known systems detect the cut surface of the respective product (and thus a flat side of the slice cut off next) in order in particular to recognize or determine different product portions and their ratio within the cut surface, for example the ratio of fat content and lean meat in the case of ham. The product contour and thus the size and orientation of the cut surface can likewise be detected by such systems and are already detected in practice in certain applications.

In accordance with the invention, the orientation and size of the cut surface can in each case be made available to the control unit of the treatment agent device in order thus, for example, to adjust the amount of the treatment agent to be provided for the respective slice in dependence on the size of the cut surface or to correspondingly align a nozzle serving for the dispensing of the treatment agent in dependence on the orientation of the cut surface. If the treatment agent device, for example, has a plurality of nozzles for one product from which treatment agent can be dispensed for this product, the control unit of the treatment agent device can then e.g. determine the number of nozzles to be used in dependence on the size and/or the orientation of the cut surface.

Further advantageous embodiments of both the slicing apparatus in accordance with the invention and the method in accordance with the invention are also set forth in the dependent claims, the drawing, and the following description.

The cutting operation or the operating information relating to the cutting operation generally comprise everything that has to do in some form with a respective operation of the slicing apparatus. This in particular includes both parameters or characteristic values of the slicing apparatus and parameters or properties of the respective products to be sliced.

Thus, the operating information can, for example, comprise the respective configuration of the slicing apparatus, for example the type of cutting blade, the size of the cutting blade, and the cutting speed (that is the number of cutting movements of the cutting blade per time unit). With respect to the products, the operating information can relate to the product type, the consistency of the product, the "stickiness"

of the product, or—as explained above—the size and/or the orientation of the product slices.

The operating information can also relate to the time sequence of the cutting operation in that it is, for example, taken into account by the treatment agent device when a slice has been completely cut off from the respective product in a respective track in the case of a multi-track product feed during a work cycle—that is during a working movement, in particular a revolution, of the cutting blade. For this takes place sequentially in time in the individual tracks—due to the passage of the cutting blade through the cutting region that takes place for a certain time.

Furthermore, the operating information can comprise a respective working position of a component of the slicing apparatus. This can, for example, be the angular position of the revolving or rotating cutting blade or the position of a feed device of the product feed in the feed direction, for example, the position of a product holder engaging at the rear end of a respective product or of a product transport belt on which a respective product is disposed or which acts on a respective product from the side or from above.

As already explained above, the operating information can furthermore comprise measured values of sensors that collect information on the products, on one or more components of the slicing apparatus, or on certain interactions between a respective product and one or more components of the slicing apparatus.

The control unit of the treatment agent device can be integrated into the control device of the slicing apparatus, that is into the slicer control, it can be formed by the slicer control, or it can be provided as a separate unit, but connected in a wired and/or wireless manner to the control device.

The relationship between the slicer control and the control unit of the treatment agent device can be organized in accordance with a concept which has been designated as a "master-slave" in the past and for which other designations are increasingly being used at present, for example "primary-secondary", with the slicer controller forming the "master" or "primary" and the control unit of the treatment agent device forming the "slave" or "secondary".

The liquid treatment agent can, for example, be a separating agent that prevents a disruptive sticking together of slices and thus facilitates the separation of two slices disposed above one another and that is, for example, based on a vegetable oil. Alternatively, the treatment agent can be a protective agent that in particular improves the shelf life of the respective food. For example, the protective agent can be provided with a property that prevents or delays the formation of germs or mold. The protective agent can, for example, include corresponding microorganisms.

In some embodiment examples of the invention, provision can be made that the treatment agent device is configured to apply treatment agent in a contactless manner. This can, for example, take place by a contactless metering that is also designated as "jetting". In this way, the products or slices do not need to contact the treatment agent device in order to apply the treatment agent. Alternatively, it is, however, also possible in accordance with the invention to provide one or more scrapers, for example, that each come into contact with the product or a respective slice in order to apply the treatment agent.

In accordance with some embodiment examples, the treatment agent device can be configured to dispense treatment agent in the form of individual, flying liquid amounts or to spray treatment agent.

Furthermore, provision can be made that the treatment agent device is configured to dispense treatment agent continuously in time or discontinuously in time. In the case of a discontinuous dispensing of treatment agents in time, this can take place at regular time intervals, for example. The dispensing can in particular take place in the cycle of the working movements of the cutting blade. However, this does not preclude that—as already explained elsewhere—temporarily no dispensing of treatment agent takes place, for example, during a plurality of consecutive work cycles in a blank cut phase of the slicing apparatus. In the case of a dispensing of treatment agent that is continuous in time, a mist of treatment agent can, for example, be permanently produced by spraying treatment agent. This does not preclude that temporarily no dispensing of treatment agent takes place, for example in cutting pauses in each case after the complete slicing of a product until the start of the slicing of the next product in the respective track.

Furthermore, in some embodiments of the invention, provision can be made that the treatment agent device has at least one dispensing opening for treatment agent for the one track in the case of a single-track product feed or for each track in the case of a multi-track product feed. In the case of a multi-track product feed, the treatment agent device can be operated individually per track. This means that the provision of treatment agent at each track or at a group of tracks can take place independently of one or more other tracks or groups of tracks.

The or each dispensing opening can be formed by a nozzle. Provision can be made that the dispensing opening can either be released or closed in a targeted manner by means of the control unit, e.g. by means of a controllable valve that is associated with the respective dispensing opening or with a group of dispensing openings comprising the respective dispensing opening, and provision can alternatively or additionally be made that the dispensing direction of treatment agent can be changed by means of the control unit, for example, by adjusting a nozzle forming the dispensing opening.

The application of the treatment agent to the food can take place in different ways. Thus, the treatment agent can, for example, be applied to the respective cut surface of a product, that is to the flat side of a respective slice that is cut off next. Alternatively, the treatment agent can be applied to an already cut-off slice, and indeed either only to one flat side or to both flat sides of the respective slice. The time of the application of the treatment agent to a respective slice can generally be selected as desired. The treatment agent can be applied to a slice that has been cut off, but is still falling. Alternatively, the treatment agent can be applied to a slice that is already lying, in particular if the slice is still in the portioning region. Thus, the treatment agent can, for example, be applied to the upper side of the last slice to come to rest in the portioning region before the next slice falls onto the portion thus being formed in the portioning region.

Accordingly, in some embodiments of the slicing apparatus, provision can be made that the dispensing opening is or can be directed onto the cutting region to apply the treatment agent to a respective cut surface of a product that is currently being sliced, or that the dispensing opening is or can be directed onto a falling region, which is disposed between the cutting region and the portioning region, of the slices cut off from a respective product that is currently being sliced, or the dispensing opening is or can be directed onto the portioning region to apply the treatment agent to a respective flat side of a falling or lying slice.

In accordance with some embodiment examples, the treatment agent device can comprise at least one dispensing unit that has at least one dispensing opening and that is in connection with a treatment agent store. The dispensing unit can be arranged at a respective ideally suitable position at or in the slicing apparatus such that the at least one dispensing opening is positioned and/or oriented in the respective desired manner. The dispensing unit can, for example, be connected via one or more flexible lines to the treatment agent store that can, for example, comprise at least one container that is arranged at or in the slicing apparatus and that is in particular replaceable and/or refillable. In this way, the treatment agent device can be flexibly adapted to the respective structural conditions of the slicing apparatus and can be integrated into it.

Furthermore, provision can be made in accordance with the invention that all the dispensing openings of the treatment agent device or at least one group of dispensing openings of the treatment agent device are integrated into a common dispensing unit, wherein the dispensing unit is associated with a plurality of tracks in the case of a multi-track product feed. Such a common dispensing unit facilitates the integration of the treatment agent device into the slicing apparatus, in particular when a plurality of dispensing openings or nozzles are provided, which is in particular the case when the slicing apparatus has multiple tracks.

The dispensing unit can comprise a carrier which extends transversely to the feed direction and at or in which a plurality of nozzles, which each form a dispensing opening, and feed lines, which lead to the nozzles, for the treatment agent are attached.

Furthermore, in some embodiment examples, provision can be made that the treatment agent device has a plurality of dispensing openings, which are controllable independently of one another, for the one track in the case of a single-track product feed or for at least one track in the case of a multi-track product feed. It has already been mentioned elsewhere that a particularly flexible adaptation to the respective cutting operation can take place in this manner in that, for example, only some of the dispensing openings generally provided for the respective track are used in dependence on the respective application. It is e.g. also possible to provide different treatment agents and, for example, to apply either the one treatment agent via one or more of the dispensing openings or a treatment agent different therefrom via one or more of the other dispensing openings in dependence on the application. Furthermore, it is also possible to simultaneously use a plurality of dispensing openings, but to apply different treatment agents—and thus to apply them simultaneously—via said dispensing openings.

In accordance with further embodiment examples of the invention, provision can be made that the treatment agent comprises a plurality of components that are stocked separately and that can be combined prior to or on the dispensing through a dispensing opening. In this respect, one of the components can, for example, be actively supplied, in particular by means of a pump, to the respective dispensing opening, wherein the flow of this component in the region of the dispensing opening can convey the other component of the treatment agent by suction utilizing the Venturi principle so that a mixture of the plurality of components is provided as the treatment agent.

As already mentioned elsewhere, provision can be made in accordance with some embodiment examples of the invention that the treatment agent device can be controlled with respect to the dispensing time, in particular with respect to the cycle of the working movements of the cutting blade, and/or with respect to the dispensing amount and/or with respect to the dispensing direction of the treatment agent.

Provision can furthermore be made that the dispensing time, and/or the dispensing amount, and/or the dispensing direction of the treatment agent is/are varied during the cutting operation. Such a change in the provision of the treatment agent during the cutting operation can, for example, take place from product to product or also from slice to slice. In a multi-track operation of the cutting device, such a change can take place individually per track.

As likewise already mentioned elsewhere, provision can be made in accordance with some embodiments that no treatment agent is dispensed during the carrying out of blank cuts for which the cutting blade performs cutting movements, but no slices are cut off from a respective product.

Furthermore, provision can be made in the method in accordance with the invention that, during the cutting operation, the dispensing of treatment agent is coordinated in time with the working position of at least one component of the slicing apparatus. The coordination can, for example, also take place with the angular position of the revolving or rotating cutting blade or with the position of a feed device of the product feed in the feed direction, preferably with the position of a product holder or of a product transport belt.

In accordance with some embodiment examples of the method, provision can be made that, during the cutting operation, the dispensing of treatment agent is controlled in dependence on measured values of at least one sensor arranged upstream of the slicing apparatus or of at least one sensor integrated into the slicing apparatus, in particular of a sensor arranged upstream of the slicing apparatus for determining the outer contour and/or the inner structure of a respective product, or of a sensor integrated into the slicing apparatus for determining the size and/or the orientation of a respective cut surface of a product that is currently being sliced, or of a sensor integrated into the slicing apparatus for recognizing the start and/or the end of a product that is to be sliced or is currently being sliced.

The sensor can be a device that is anyway provided for the slicing apparatus and whose measured values can also be used by the control device of the slicing apparatus for purposes other than for controlling the treatment agent device. Alternatively, the sensor can also be such a sensor that only provides measured values for the treatment agent device. Thus, a camera for detecting the cut surface of a respective currently sliced product can, for example, only serve to provide information on the size and/or the orientation of the cut surface in order to control the provision of treatment agent in dependence thereon.

As likewise already mentioned elsewhere, in the method in accordance with the invention, provision can be made that the treatment agent is applied to a respective cut surface of a product that is currently being sliced or to a respective flat side of a falling or lying slice.

Some possible applications and possibilities of use of the invention have already been explained above. Further possibilities of use will be disclosed in the following, wherein it is clear to the skilled person that some or all of the possibilities of use disclosed herein can either be applied simultaneously or after one another in time in a respective cutting operation.

With the invention, it is in particular possible to omit the provision of the treatment agent when a product start or a product end is recognized. Alternatively, the treatment agent device can in each case be tested or flushed at these times.

Alternatively to a targeted dispensing of treatment agent, it is generally also possible to generate an aerosol in a specific region of the slicing apparatus, i.e. a mist of the treatment agent through which the cut-off slices fall in order to be provided with the treatment agent in this manner. Such a mist can, for example, be generated in a protective blade guard of the slicing apparatus, wherein the working movements of the cutting blade taking place during the cutting operation ensure that the treatment agent is transferred into the region of the falling slices. Passages to which treatment agent is supplied and from which the treatment agent is dispensed during the cutting operation could alternatively or additionally be formed in the cutting blade. In this respect, it is therefore the cutting blade by which the treatment agent is applied to the cut surface of the product or to the cut-off slices.

A common dispensing unit already mentioned above, into which all the dispensing openings or at least one group of dispensing openings are integrated, can be designed as an elongate nozzle bar, for example. Such a common dispensing unit or a plurality of individual nozzles can be configured such that they can, for example, be removed without tools to be cleaned or replaced. The dispensing unit or individual nozzles can, for example, be fastened to a portioning unit, to a cutting head housing, or to a protective blade guard of the slicing apparatus. A simple cleaning and maintenance are possible in this manner.

As already mentioned elsewhere, the treatment agent can, for example, be a separating agent or a protective agent. Combinations of different treatment agents are also possible, i.e. the sticking together of the slices can be prevented and the shelf life can simultaneously be extended by the invention if separating agents and protective agents are provided at the same time. Furthermore, it is alternatively or additionally possible with the invention to apply treatment agent in the form of flavoring substances, flavoring agents, and/or dyes, and/or in the form of smoke.

The invention can also be used in conjunction with interleavers such as have already been explained above. In order not to have to use plastic for the material webs for such an interleaver, an interleaver working with environmentally friendly paper can be used and the treatment agent device in accordance with the invention can be used to apply a liquid separating agent to the interleaver paper, for example by spraying. In this respect, the separating agent is consequently not applied directly to the food, but the mode of action and/or environmental friendliness of an interleaver is/are improved.

The total treatment agent device or individual components thereof, for example nozzles, storage tanks, or additionally provided compressed air devices, can be temperature-controllable to ensure an ideal viscosity of the treatment agent for the respective application.

For a respective track, a cover, which is adapted to the size and orientation of the cut surface of the respective product, can be arranged upstream of one or more of the dispensing openings of the treatment agent device provided for this track.

Such a cover ensures that any treatment agent dispensed, for example sprayed, via the dispensing opening or dispensing openings of the respective track only impacts the cut surface of the product. Excess treatment agent, which without the cover would move next to the cut surface and thus be dispensed unused, can hereby be intercepted by means of the cover and can run off at the cover in order to be collected and supplied for a reuse.

Further possible embodiments of the invention are mentioned in the following, and indeed both of the apparatus in accordance with the invention and of the method in accordance with the invention. These embodiments can be combined as desired with one another and with embodiments disclosed elsewhere herein.

Multi-component nozzles can be provided for providing the treatment agent, wherein at least one of the nozzles serves to expel air in order to atomize treatment agent provided via at least one of the other nozzles. In this respect, provision can be made that the control unit also controls the air nozzles by means of the signals for controlling the treatment agent nozzles, wherein in particular the control unit controls the air nozzles synchronized in time with the nozzles for the treatment agent.

The slicing apparatus can be configured to monitor the treatment agent device, e.g. with respect to a filling level of the treatment agent, for example in a treatment agent store, with respect to a flow of the treatment agent through one or more treatment agent lines, and/or the occurrence of leakages affecting the treatment agent or other disturbances such as blockages in the lines. The monitoring in particular takes place by means of the control unit. For this purpose, a pressure sensor can, for example, be provided in a treatment agent line and supplies a signal from whose temporal course pressure differences in the line can be determined. These pressure differences enable conclusions to be drawn about a proper flow per se, about the amount of treatment agent flowing through the line per unit of time, that is the flow rate, or about any disturbances that may be present. A monitoring can alternatively or additionally take place by means of a capacitive sensor at the line guiding the treatment agent. With such a sensor, different treatment agents and also generally different media in the respective line can be recognized, i.e. changes of the treatment agent can be detected. If, for example, the presence of oil is detected, a proper state with a still sufficiently filled oil reservoir can be concluded. If, in contrast, the presence of air is detected, the control unit can conclude that the storage container is empty. Conclusions about a proper flow in a treatment agent line per se, about the amount of treatment agent flowing through the line per unit of time, or about possibly existing disturbances can also be drawn with the aid of an indication element, e.g. a ball, which is located in the line guiding the treatment agent, which floats in the treatment agent, and whose position can be queried by a suitable detection device—e.g. within the framework of a two-point query or a two-point regulation or an analog position query.

As regards the direction of a dispensing of treatment agent by the treatment agent device, different devices for setting or aligning can be provided. An alignment can, for example, take place automatically. It is alternatively or additionally possible to use a laser pointer or another adjustment aid by which a respective desired "target region" can be marked in order then, for example, to carry out an automatic or manual alignment, for example, of dispensing nozzles for the treatment agent using the visible or otherwise detectable marking.

A quick-change system can be provided for a storage container for the treatment agent to facilitate a container change and to reduce the set-up times.

Some or all of the functions of the control unit for the treatment agent device can be incorporated into the control device that controls the cutting operation and thus also the slicing apparatus. It can hereby be achieved that all the functionalities that are also required for the control of the treatment agent device are present at an interface of the control device. In other words, at its interface, the slicing apparatus is independent of a respective specific connection of a treatment agent device.

A cleaning device can be provided that is configured to flush and/or to disinfect components of the treatment agent device that are predefined as part of a cleaning function such as hoses and nozzles for the treatment agent. Provision can be made that this cleaning function can be selected at the control device of the slicing apparatus. For a cleaning medium to be used in this cleaning, a container can be provided that is either permanently present and connected to the treatment agent device so that a switchover to this cleaning medium container for the cleaning can only be made by means of the control device, or that is installed instead of a treatment agent store and that is connected to the treatment agent device for the cleaning, i.e. a container for the treatment agent is temporarily exchanged for the cleaning medium container for a cleaning process.

As also explained in the following in connection with a possible embodiment example, provision can generally be made that the provision of the treatment agent—in particular a dispensing by ejection or spraying—can be set with respect to the direction, and indeed in dependence on the position and/or the size and/or the orientation of the cut surface of a respective product to be sliced or in dependence on the position and/or the size and/or the orientation of the flat side of a respective cut-off slice. Dispensing openings, which are e.g. each formed by a nozzle, can be oriented in a targeted manner for a respective application such that it is ensured that the treatment agent at least for the very predominant part only reaches the cut surface or the flat side and is not ejected or sprayed past it. The treatment agent device thus allows a flexible adaptation to a respective application and in particular to the respective product to be sliced. The alignment of the nozzles can take place in a manual or controlled manner. Not only the alignment, but also the number of nozzles per track can be varied and can thus be adapted in a targeted manner to the respective application. A plurality of nozzles can therefore be combined in a technical control manner as needed in order to apply the treatment agent together in one track to the cut surface of the product or to the flat sides of the slices.

Furthermore, provision can be made that—for example once, randomly or within the framework of a permanent automatic regulation—a check of the application of the treatment agent to the cut surface and/or the flat side is carried out, and indeed with respect to which part of the cut surface or flat side is actually provided with the treatment agent at a respective setting of the treatment agent device, in particular a setting with respect to the application direction and/or the application amount of the treatment agent. A check can therefore be made whether the treatment agent is applied to the total cut surface or flat side or only to a part thereof. The setting of the treatment agent device can then be changed as required if the result of the check does not correspond to the respective desired aim of the application of the treatment agent. The check and the change of the setting that may be performed can take place fully automatically. The check can, for example, take place by optical sensors, for example by a camera or a device for spectral analysis or hyperspectral analysis, in particular by means of a hyperspectral camera.

In some embodiments, provision can be made that, on the application of treatment agent, the control unit can distinguish between the first slice of a portion comprising a plurality of slices and the further slices of this portion and can perform the application of treatment agent differently for the first slice, e.g. use a smaller amount of treatment agent, than for the further slices. If a support surface in the portioning region onto which the cut-off slices fall, for example, has a specific property that is critical for a specific amount of treatment agent, a lower or a higher amount of treatment agent can then be provided, depending on which amount is better in connection with the specific property of the support surface, for the first slice—and only for this first slice—of the portion when this first slice comes to rest on the support surface with that flat side which is provided with the treatment agent. If the treatment agent is e.g. an oil and there would be excessive slippage between the support surface and the flat side of the first slice provided with a standard amount of oil predefined for the slices, a smaller amount of oil can then be predefined for the first slice or the first slice cannot be provided with the treatment agent at all. This can be automatically initiated by the control unit when it receives the corresponding information as part of the operating information.

The possibilities of use explained above each represent independent aspects of the invention for which protection is also in each case claimed independently of other aspects.

Figure 2:
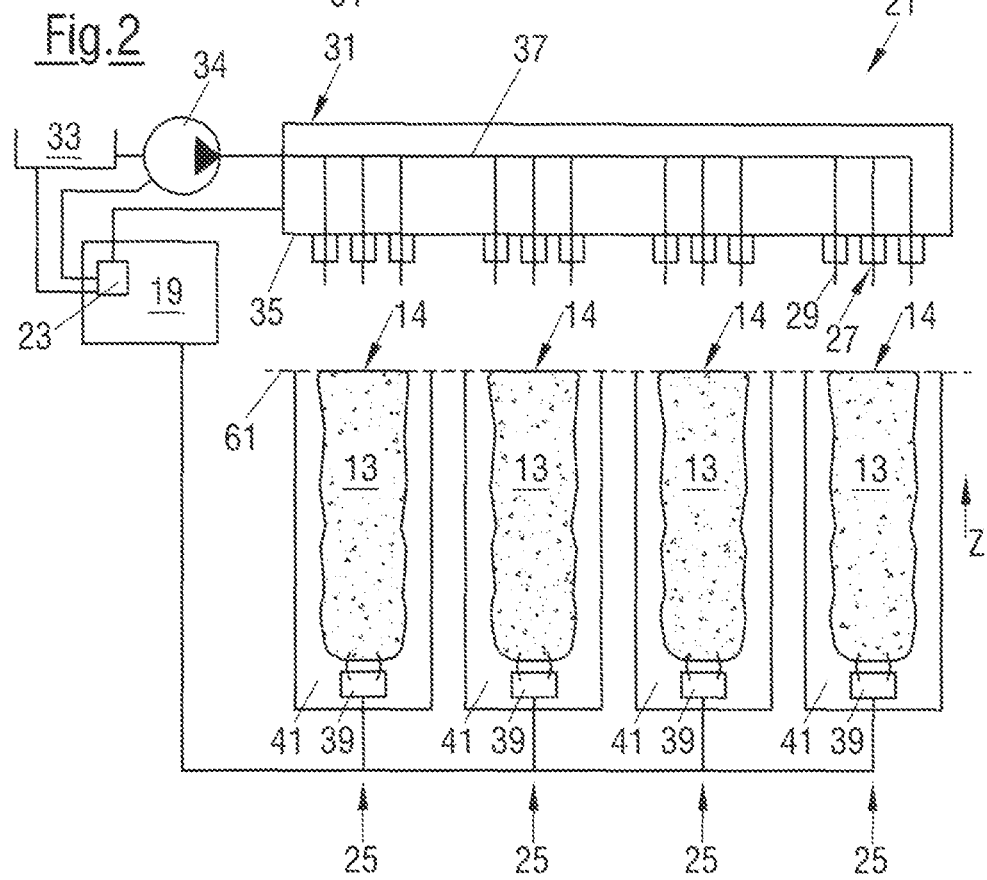

The invention will be described in the following by way of example with reference to the drawing. There are shown:

FIG. 1 schematically a slicing apparatus in accordance with the invention in a side view; and FIG. 2 schematically a plan view of a part of the slicing apparatus of FIG. 1.

The slicing apparatus shown in FIGS. 1 and 2 is a high-performance slicer which can simultaneously slice four products 13 disposed next to one another using a cutting blade 15 that is, for example, configured as a scythe-like blade. A product holder 39, which is also designated as a product gripper, is provided for each product 13 and engages into the rear product end during a cutting operation. The products 13 to be sliced are each disposed on a product support that is formed by two transport belts 41—a long rear one and a short front one—following one another in a feed direction Z and that, for the sake of simplicity, are not shown individually in FIG. 2. Instead of the two consecutive transport belts 41, the product support can alternatively be formed by a single transport belt or by a passive sliding surface. In addition, the product feed 11 of the slicing apparatus 10, which is also simply designated as the slicer, can have an upper transport belt or another transport device for each product 13, said product feed 11 forming the product holders 39 and the transport belts 41.

The individual components of the product feed 11 are connected to a central control 19 of the slicer 10, as is indicated by the individual lines in FIG. 1 and FIG. 2. The central control device 19 is also simply designated as a slicer control in the following.

The blade edge of the scythe-like blade 15 defines a cutting plane 61 in which the blade 15 successively cuts off slices 17 from the products 13 during the cutting operation. In one work cycle of the slicer 10, i.e. per revolution of the scythe-like blade 61 about a blade axis not shown here, a respective one slice 17 is cut off from each product 13.

FIG. 1 shows a slice 17a in the process of being formed that is not yet completely cut off from the product 13, a falling slice 17 that was previously cut off from the product 13, and a portion 20 that is disposed on a portioning belt 71 in the portioning region and that consists of a plurality of slices 17 that are disposed above one another and that were previously cut off from the product 13. During the cutting operation, slices 17 cut off from the respective product 13 therefore fall downwardly and form a portion 20 comprising a plurality of slices 17 disposed above one another on the portioning belt. The portioning belt 71 serves to transport away a respective finished portion 20, which satisfies predefined conditions such as in particular a specific number of slices 17 or a specific portion weight, in a transport-away direction T, whereupon the portioning belt 71 is again free for the formation of the next portion. During such a transport away of a finished portion, the slicer 10 is in a so-called blank cut operation in which the blade 15 continues to rotate at the operating speed, but does not cut off any slices 17 from the product 13 since the product feed 11 is not active during the carrying out of these blank cuts, i.e. does not convey the respective product 13 in the feed direction Z. Alternatively or additionally to such a stop of the product feed 11, the blade 15 can be moved out of the cutting plane 61 away from the cut surface 14 of the product 13 to carry out blank cuts. The concept of a blank cut operation is generally known to the skilled person so that it does not need to be looked at in more detail here.

The cutting operation, including the performance of blank cuts, the control of an interleaver 51 described in more detail in the following and of further sequences during the cutting operation which will be looked at in more detail in the following, are controlled by the central slicer control 19. All operating information in this respect is available at the control device 19.

To cut off the slices 17 from a respective product 13, the blade 15 cooperates with a cutting edge 63 that forms the end of the product support of the product feed 11. The opening of an output device 57 of the already mentioned interleaver 51, which serves to provide so-called interleaved sheet material in the cutting region of the slicer 10, is located beneath the cutting edge 63. The interleaved sheet material, which is removed as a material web 53 from a material store 55 present as a material roll in a generally known manner during the operation of the interleaver 51, is introduced into the cutting region and is in each case cut off as an interleaved sheet from the material web 53 by means of the blade 15 such that an interleaved sheet is present between consecutive slices 17. The output of the interleaved sheet material into the cutting region via the output device 57, for example, takes place by a driven feed roller 58 that cooperates with a pressing roller 59.

The interleaver 51 is likewise configured for a multi-track operation, i.e. it can provide the interleaved sheet material on multiple tracks and in particular individually per track.

A treatment agent device in accordance with the invention, which will be described in more detail in the following, can satisfy one of the additional functions mentioned in the introductory part, and indeed generally independently of the purpose of the interleaver 51. The treatment agent device 21 can supplement the interleaver 51 or the treatment agent device 21 can also replace the interleaver 51, i.e. no interleaver is present in some embodiment examples of a slicing apparatus in accordance with the invention since the function of the interleaved sheets, namely to prevent a sticking together of slices 17 disposed above one another in a portion 20, is satisfied by the treatment agent device 21.

As likewise already mentioned in the introductory part, a supplementing of the interleaver 51 by a treatment agent device 21 in accordance with the invention can take place in that a suitable treatment agent is applied to the interleaved sheet material in order, for example, to treat an interleaved sheet material which per se only has a small low separation effect such that the separation effect is increased. A paper having a small separation effect can, for example, in this way be given the significantly higher separation effect of film materials used by interleavers in a conventional manner.

In the embodiment example shown, the treatment agent device 21 comprises an elongate dispensing unit 31 (cf. also FIG. 2) that extends transversely to the feed direction Z across all four tracks 25 of the slicer 10. A plurality of nozzles are attached to an elongate carrier 35 of the dispensing unit 31 in a manner distributed in the direction of extent, of which plurality of nozzles only one is provided with the reference numeral 29 in FIG. 2 for the sake of simplicity. The front end of a respective nozzle 29 forms a dispensing opening 27 from which a treatment agent can, for example, be sprayed or dispensed as a succession of individual, flying liquid amounts.

The feed of the treatment agent to the nozzles 29, which is schematically shown in FIG. 2, e.g. takes place via a feed line 37 which extends in or at the dispensing unit 31 and from which individual line sections branch off that lead to the nozzles 29. Controllable valves not shown here can be provided that can be controlled individually or in groups to control, i.e. specifically to enable or to prevent, the dispensing of treatment agent for the nozzles 29 individually or in groups. In the embodiment example of FIG. 2 that is only shown by way of example, a group of three nozzles 29 is associated with each track 25. Depending on the size and/or the orientation of the cut surface 14 of a respective product 13, the number of active nozzles per track 25 can be varied and can thus be specifically adapted to the respective application. In addition, it can be possible to align the nozzles in a manual or controlled manner in order in this way to be able to set the dispensing direction of the treatment agent in a targeted manner for each nozzle 29.

The feed line 37 of the dispensing unit 31 is connected to a container serving as a treatment agent store 33, and indeed while interposing a controllable pump 34 by means of which the treatment agent is conveyed from the store 33 to the nozzles 29.

A control unit 23, which is in each case schematically shown as a separate unit in FIGS. 1 and 2, is provided for the control of the treatment agent device 21 during the cutting operation of the slicer 10. The control unit 23 can form a physically and/or functionally separate unit of the slicer control 19 and can in this respect be integrated therein. The control unit 23 can, for example, represent a hardware module and/or a software module, for example, in the sense of a separate application within the control device 19. Alternatively, it is also possible to provide the control unit 23 for the treatment agent device 21 spatially separately from the slicer control 19 and to connect it to the control device 29 in a wireless or wired manner. As FIG. 2 shows, the control unit 23 is inter alia connected to the store 33 in order e.g. to measure the respective treatment agent amount still present therein; to the pump 34 in order e.g. to control the amount of treatment agent to be supplied per unit of time to the dispensing unit 31; and to the dispensing unit 31 in order to control the operation of the nozzles 29.

The control of the treatment agent device 21 by the control unit 23 does not take place independently, but in dependence on the cutting operation of the slicer 10 on the basis of operating information of the slicer control 19, and indeed operating information that relate to the cutting operation of the slicer 10.

This dependence of the treatment agent device 21 on the slicer control 19 was already looked at in more detail in the introductory part. The blank cut operation must be mentioned again at this point as an example: During the cutting off of slices 17, the dispensing unit 31 of the treatment agent device 21 can, for example, be controlled such that in each work cycle a predefined amount of treatment agent—depending on the orientation of the nozzle 29 or of the group of nozzles 29—is sprayed onto the cut surface 14 of the respective product 13, onto one of the flat sides of a falling slice 17, or onto the upper side of the respective slice 17 of a portion 20 disposed completely at the top, or is ejected as a flying liquid amount. During a blank cut operation in which no slices 17 are cut off, the control unit 23 supplied with this blank cut operating information ensures that no treatment agent is dispensed during the blank cut phase since this is simply not necessary due to the lack of slices 17 being formed and would otherwise mean a waste of treatment agent and an unnecessary soiling of the slicer 10.

As likewise already explained in the introductory part, the dispensing of treatment agent can take place in dependence on different sensors 45, 47, 49, and 43.

The sensor 43 is arranged upstream of the slicer 10 and can be formed by a product scanner that can be part of the slicer 10 or can be a separate apparatus. The scanner 43, for example, serves to determine the outer product contour in order to provide the slicer control 19 with information on the course of the product cross-section and thus to control the product feed 11 accordingly. Such a control of the product feed is generally known to the skilled person. The slicer control 19 consequently has information relating to the size and/or the orientation of the current cut surface 14 for each work cycle of the slicer 10. This information can be used by the treatment agent device 21 via the control unit 23 in order, for example, to accordingly adjust the dispensing amount of the treatment agent per spraying or ejection process in dependence on the size of the cut surface 14.

In addition to such an integrated or separate scanner 43, sensors 45, 47, 49 integrated into the slicer 10 can be provided. The sensors 47 and 49 serve to recognize the product start and the product end. Instead of the two sensors 47, 49, only one single sensor can be provided that can recognize both the product start and the product end. This information can likewise be used by the control unit 23 of the treatment agent device 21 to ensure that the treatment agent is only dispensed when it is also actually required.

Furthermore, in the embodiment example shown, the slicer 10 is provided with a sensor 45, which can detect the cut surface 14 of the products 13, at that side of the cutting plane 61 on which the treatment agent device 21 is also arranged. This sensor 45 can, for example, be provided with a light source and a camera. Such a sensor 45 can, for example, likewise serve to determine the size and/or the orientation of the cut surface 14, and indeed, for example, in cases where there is no scanner 43. Alternatively, such a sensor 45 can also supplement the information provided by a scanner 43. However, such a sensor 45 can also provide other information, for example information on the distribution of different product proportions such as fat, on the one hand, and lean meat, on the other hand, at the respective cut surface 14. This information provided by the sensor 45 can be processed by the control unit 23 of the treatment agent device 21 or by the slicer control 19 and can likewise be used to control the operation of the treatment agent device 21.

In the embodiment example of FIGS. 1 and 2, provision is made that the sensor 45 is directly connected to the control unit 23 of the treatment agent device 21 in order thus to illustrate that the treatment agent device 21 can also have its own devices—such as the sensor 45 here—to obtain information relating to the cutting operation. This indeed does not rule out that the measured values of the sensor 45 can also be used by the slicer control 19 for other purposes than the operation of the treatment agent device 21.

REFERENCE NUMERAL LIST 10 slicing apparatus
11 product feed
13 product
14 cut surface of a product
17 cutting blade
17 slice
17a slice being formed
19 control device
20 portion
21 treatment agent device
23 control unit
25 track
27 dispensing opening
29 nozzle
31 dispensing unit
33 treatment agent store
34 pump
35 carrier of the dispensing unit
37 feed line
39 product holder
41 product transport belt
43 sensor
45 sensor
47 sensor
49 sensor
51 interleaver
53 material web
55 material store
57 output device
58 feed roller
59 pressing roller
61 cutting plane
63 cutting edge
71 portioning belt
Z feed direction
T transporting-away direction

The invention claimed is:

1. A slicing apparatus for slicing food products, the slicing apparatus comprising a product feed that feeds products to be sliced on one or more tracks in a feed direction to a cutting region in which the products are cut into slices during a cutting operation of the slicing apparatus by means of a cutting blade that performs cutting movements;
a portioning region in which portions are formed from the slices and each comprise one slice or a plurality of slices disposed at least partly above one another; and
a control device that controls the cutting operation and that has operating information that relates to the cutting operation,
wherein a treatment agent device for providing a liquid treatment agent is integrated into the slicing apparatus and is configured to provide the treatment agent during the cutting operation such that the treatment agent is applied to a respective cut surface of a product and/or to at least one respective flat side of at least one slice, and
wherein a control unit is provided for the treatment agent device and is configured to control the operation of the treatment agent device in dependence on the cutting operation on the basis of at least a portion of the operating information of the control device, and wherein the treatment agent device has a plurality of dispensing openings, which are controllable independently of one another, for the one track in the case of a single-track product feed or for at least one track in the case of a multi-track product feed.

2. The slicing apparatus in accordance with claim 1, wherein the treatment agent device is configured to apply treatment agent in a contactless manner.

3. The slicing apparatus in accordance with claim 1, wherein the treatment agent device is configured to dispense treatment agent in the form of individual, flying liquid amounts or to spray treatment agent.

4. The slicing apparatus in accordance with claim 1, wherein the treatment agent device is configured to dispense treatment agent continuously in time or discontinuously in time.

5. The slicing apparatus in accordance with claim 1, wherein the treatment agent device has at least one dispensing opening for treatment agent for the one track in the case of a single-track product feed or for each track in the case of a multi-track product feed, wherein the treatment agent device can be operated individually per track in the case of a multi-track product feed.

6. The slicing apparatus in accordance with claim 5, wherein the dispensing opening is or can be directed onto the cutting region to apply the treatment agent to a respective cut surface of a product that is currently being sliced, or wherein the dispensing opening is or can be directed onto a falling region, which is located between the cutting region and the portioning region, of the slices cut off from a respective product that is currently being sliced, or the dispensing opening is or can be directed onto the portioning region to apply the treatment agent to a respective flat side of a falling or lying slice.

7. The slicing apparatus in accordance with claim 1, wherein the treatment agent device comprises at least one dispensing unit that has at least one dispensing opening and that is in connection with a treatment agent store.

8. The slicing apparatus in accordance with claim 5, wherein all the dispensing openings of the treatment agent device or at least one group of dispensing openings of the treatment agent device are integrated into a common dispensing unit, wherein the dispensing unit is associated with a plurality of tracks in the case of a multi-track product feed.

9. The slicing apparatus in accordance with claim 7, wherein the dispensing unit comprises a carrier which extends transversely to the feed direction and at or in which a plurality of nozzles, which each form a dispensing opening, and feed lines, which lead to the nozzles, for the treatment agent are attached.

10. The slicing apparatus in accordance with claim 8, wherein the dispensing unit comprises a carrier which extends transversely to the feed direction and at or in which a plurality of nozzles, which each form a dispensing opening, and feed lines, which lead to the nozzles, for the treatment agent are attached.

11. The slicing apparatus in accordance with claim 1, wherein the treatment agent comprises a plurality of components that are stocked separately and that can be combined prior to or on the dispensing through a dispensing opening.

12. A method of operating a slicing apparatus for slicing food products, the slicing apparatus comprising a product feed that feeds products to be sliced on one or more tracks in a feed direction to a cutting region in which the products are cut into slices during a cutting operation of the slicing apparatus by means of a cutting blade that performs cutting movements;

a portioning region in which portions are formed from the slices and each comprise one slice or a plurality of slices disposed at least partly above one another; and
a control device that controls the cutting operation and that has operating information that relates to the cutting operation,
a treatment agent device that is integrated into the slicing apparatus, the method comprising the steps of:
applying a liquid treatment agent to a respective cut surface of a product and/or to at least one respective flat side of at least one slice during the cutting operation by the treatment agent device, and
controlling the operation of the treatment agent device on the basis of at least a portion of the operating information of the control device,
wherein no treatment agent is dispensed during the carrying out of blank cuts for which the cutting blade performs cutting movements, but no slices are cut off from a respective product.

13. The method in accordance with claim 12, wherein the treatment agent device is controlled with respect to the dispensing time.

14. The method in accordance with claim 12, wherein the dispensing time, and/or the dispensing amount, and/or the dispensing direction of the treatment agent is/are varied during the cutting operation.

15. The method in accordance with claim 12, wherein, during the cutting operation, the dispensing of treatment agent is coordinated in time with the working position of at least one component of the slicing apparatus.

16. A method of operating a slicing apparatus for slicing food products, the slicing apparatus comprising a product feed that feeds products to be sliced on one or more tracks in a feed direction to a cutting region in which the products are cut into slices during a cutting operation of the slicing apparatus by means of a cutting blade that performs cutting movements;
a portioning region in which portions are formed from the slices and each comprise one slice or a plurality of slices disposed at least partly above one another; and
a control device that controls the cutting operation and that has operating information that relates to the cutting operation, a treatment agent device that is integrated into the slicing apparatus, the method comprising the steps of:
applying a liquid treatment agent to a respective cut surface of a product and/or to at least one respective flat side of at least one slice during the cutting operation by the treatment agent device, and
controlling the operation of the treatment agent device on the basis of at least a portion of the operating information of the control device,
wherein, during the cutting operation, the dispensing of treatment agent is controlled in dependence on measured values of at least one sensor arranged upstream of the slicing apparatus or of at least one sensor integrated into the slicing apparatus.

17. The method in accordance with claim 12, wherein the treatment agent is applied to a respective cut surface of a product that is currently being sliced or to a respective flat side of a falling or lying slice.

18. A method of operating a slicing apparatus for slicing food products comprising:
distributing a liquid treatment agent through a feed line to at least one nozzle for expulsion toward a cut surface of the food product and/or toward a flat side of the slices;

pumping the liquid treatment agent through the feed line with a controllable pump, wherein the feed line, the at least one nozzle and the controllable pump are part of a treatment agent device; and controlling at least one operational parameter of the treatment agent device by electrically controlling the controllable pump and/or a controllable valve with a control unit in electrical communication with the controllable pump and/or the controllable valve.

19. A slicing apparatus for slicing food products, the slicing apparatus comprising:
   a product feed that feeds products to be sliced on one or more tracks in a feed direction to a cutting region in which the products are cut into slices during a cutting operation of the slicing apparatus with a cutting blade that performs cutting movements;
   a portioning region in which portions are formed from the slices and each comprise one slice or a plurality of slices disposed at least partly above one another;
   a treatment agent device for providing a liquid treatment agent during the cutting operation, the treatment agent device comprising:
      a feed line for routing the liquid treatment agent from a treatment agent store to at least one nozzle for expulsion toward a cut surface of the food product and/or toward a flat side of the slices;
      a controllable pump pumping the liquid treatment agent through the feed line; and
      at least one valve disposed within the feed line to selectively control the flow of the liquid treatment agent through the feed line; and
   a control unit in electrical communication with the controllable pump and/or the controllable valve to selectively control at least one operational parameter of the treatment agent device.

20. A method of operating a slicing apparatus for slicing food products comprising:
   slicing food products into food slices with the slicing apparatus;
   distributing a liquid treatment agent through a feed line of a treatment agent device to at least one nozzle for expulsion toward a cut surface of the food product and/or toward a flat side of the slices;
   detecting operating information of the slicing apparatus;
   electrically communicating the detected operation information of the slicing apparatus to an electrical controller; and
   controlling at least one operational parameter of the treatment agent device based on the detected operation information of the slicing apparatus.

21. A slicing apparatus for slicing food products, the slicing apparatus comprising:
   a product feed that feeds products to be sliced on one or more tracks in a feed direction to a cutting region in which the products are cut into slices during a cutting operation of the slicing apparatus with a cutting blade that performs cutting movements;
   a portioning region in which portions are formed from the slices and each comprise one slice or a plurality of slices disposed at least partly above one another;
   a treatment agent device for providing a liquid treatment agent during the cutting operation, the treatment agent device distributing the liquid treatment agent toward a cut surface of the food product and/or toward a flat side of the slices; and
   an electrical controller in electrical communication with the slicing apparatus and/or one or more monitoring devices to detect operation information of the slicing apparatus and/or characteristics of the slices and/or of the food products, and in electrical communication with one or more components of the liquid treatment agent device to control at least one operational parameter of the treatment agent device.

* * * * *